(12) United States Patent  
Calderwood

(10) Patent No.: US 10,883,613 B2  
(45) Date of Patent: Jan. 5, 2021

(54) ELLIPTICAL BALL VALVE SEAL

(71) Applicant: Caterpillar Inc., Deerfield, IL (US)

(72) Inventor: Robert Charles Calderwood, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 62 days.

(21) Appl. No.: 15/964,541

(22) Filed: Apr. 27, 2018

(65) Prior Publication Data

US 2019/0331238 A1 Oct. 31, 2019

(51) Int. Cl.
*F16K 5/20* (2006.01)
*F16K 5/06* (2006.01)

(52) U.S. Cl.
CPC ............ *F16K 5/201* (2013.01); *F16K 5/0689* (2013.01); *F16K 5/0605* (2013.01); *F16K 5/205* (2013.01)

(58) Field of Classification Search
CPC ........ F16K 5/06; F16K 5/0605; F16K 5/0663; F16K 5/0668; F16K 5/0689; F16K 5/20; F16K 5/201; F16K 5/205
USPC .................................................. 251/174, 172
See application file for complete search history.

(56) References Cited

U.S. PATENT DOCUMENTS

| | | | | |
|---|---|---|---|---|
| 1,584,600 A | * | 5/1926 | Black ....................... | F16K 5/201 251/174 |
| 1,616,386 A | * | 2/1927 | O'Stroske .............. | A47B 77/16 137/270 |
| 3,192,943 A | * | 7/1965 | Moen ..................... | F16K 5/0689 137/315.11 |
| 3,266,769 A | * | 8/1966 | Shand ................... | F16K 5/0673 251/172 |
| 3,533,597 A | * | 10/1970 | Bolling ................... | F16K 5/201 251/174 |
| 3,780,985 A | | 12/1973 | Perry | |
| 3,895,776 A | * | 7/1975 | Laurens ................ | F16K 5/0668 251/148 |
| 4,193,580 A | * | 3/1980 | Norris ................... | F16K 5/0207 251/304 |
| 4,233,926 A | * | 11/1980 | Rogers .................. | F16K 5/0605 116/208 |
| 4,319,734 A | * | 3/1982 | Acar ....................... | F16K 5/201 251/174 |
| 4,477,055 A | * | 10/1984 | Partridge .............. | F16K 5/0673 137/328 |

(Continued)

FOREIGN PATENT DOCUMENTS

CN 103759025 6/2006
DE 202004019955 U1 6/2006

(Continued)

*Primary Examiner* — David Colon-Morales
(74) *Attorney, Agent, or Firm* — Miller, Matthias & Hull

(57) ABSTRACT

A valve system for metering fluid flow to an engine of a work machine is disclosed. The valve system may include a valve body which defines an annular inlet, an annular outlet, and a substantially spherical valve chamber therebetween to form a passageway. The valve system may have a spherical valve member with a fluid passage therethrough which is configured to rotate within the valve chamber to selectively meter fluid from the inlet to the outlet. The valve system may have a seat ring with a longitudinal bore with an elliptical cross-section and a sealing face hemispherically contoured to match the spherical valve member surface.

19 Claims, 6 Drawing Sheets

(56) References Cited

U.S. PATENT DOCUMENTS

| | | | | |
|---|---|---|---|---|
| 4,483,511 | A * | 11/1984 | Kushida | F16K 5/201 251/172 |
| 4,593,918 | A * | 6/1986 | Geissler | F01L 7/10 123/188.6 |
| 4,747,578 | A * | 5/1988 | Kivipelto | F16K 5/207 251/159 |
| 5,163,655 | A * | 11/1992 | Chickering, III | F16K 3/20 251/174 |
| 5,857,663 | A * | 1/1999 | Evans | B23P 15/001 251/315.14 |
| 6,499,720 | B1 * | 12/2002 | Lee | F16K 5/0678 251/174 |
| 6,681,793 | B2 * | 1/2004 | Mike | F16K 5/0636 137/15.22 |
| RE39,658 | E * | 5/2007 | Carlson | 251/118 |
| 7,275,564 | B2 * | 10/2007 | Bazin | F16K 5/201 137/625.47 |
| 7,416,164 | B2 | 8/2008 | Eggleston et al. | |
| 8,733,733 | B2 * | 5/2014 | Collison | F16K 5/0636 251/174 |
| 10,066,751 | B2 * | 9/2018 | Seko | F16K 11/0876 |
| 10,371,266 | B2 * | 8/2019 | Hall | F16K 1/2085 |
| 10,465,803 | B2 * | 11/2019 | Clement | F16K 37/0008 |
| 2003/0111631 | A1 * | 6/2003 | Gosling | F16K 5/0678 251/315.01 |
| 2011/0272613 | A1 | 11/2011 | Watanuki et al. | |
| 2014/0183395 | A1 * | 7/2014 | Popke | F16K 39/00 251/283 |
| 2015/0184761 | A1 * | 7/2015 | Kusakabe | F16J 15/062 251/314 |
| 2015/0300509 | A1 * | 10/2015 | He | F16K 5/201 251/174 |
| 2017/0023503 | A1 * | 1/2017 | Rebinsky | G01N 25/18 |

FOREIGN PATENT DOCUMENTS

| | | |
|---|---|---|
| DE | 102015200187 | 6/2016 |
| WO | WO 2011/076992 A1 | 6/2011 |

* cited by examiner

ELLIPTICAL BALL VALVE SEAL

TECHNICAL FIELD

The present disclosure generally relates to ball valves for flow control or metering as well as valve seat configurations which improve flow performance of the ball valve.

BACKGROUND

Ball valves are a type of rotary valve that controls or meters liquid or gas fluid flow in a passageway. Two basic designs of ball valves include a floating ball valve and a trunnion mounted ball valve. A ball valve typically includes a valve body which has an internal spherical chamber in communication with an inlet and outlet and is designed to connect two or more sections of tubing together. A ball member is a sphere that is disposed within the internal chamber with a flow port, such as a circular borehole or "V" shaped borehole, which permits the flow of fluid between the upstream inlet and the downstream outlet. The ball member is supported by a concentrically positioned valve stem extends through the valve body such that the ball can be externally rotated by a handle or an actuator.

The lifetime of a valve can be predicated on the quality of the valve seal. Over time, debris can build up in seat pockets which cause the valve to fail prematurely and develop leaks. Knowing this, precision ball valves the components are currently designed to be larger than required to ensure desired flow rates. In addition, current designs are also limited by the valve angle of the rotational actuator. For example, a limited angle torque actuator produces torque through a rotation angle of less than 180°. They are typically used in industrial or sensitive environments due to their high angular acceleration without torque ripple. Currently, to increase flow rates in ball valves that are actuated by limited angle torquers (LATs), the entire assembly has to be scaled larger. This adds to the weight, cost, and complexity all while increasing rotational forces and decreasing operation lifetime. Therefore, a need exists for a valve seat to prevent leakage and increase lifetime while improving flow characteristics.

U.S. Pat. No. 4,193,580 A discloses a plug-type valve seal which employs an elongated plug with ellipsoidal or curved opposing ends. The plug surface is sealed by a seat having an elongated closed loop configuration which engages the surface of the plug along a non-circular line or band.

U.S. Pat. No. 7.325.783 B2 discloses a valve seat with for use in a gate operated ball valve. The seat includes stress relief grooves formed in the flanges for reducing stress concentration on the valve seat while the gate is closed. While beneficial for increasing the lifetime of the valve assembly, there still exists a desire for a system and method that increases flow characteristics while increasing the overall lifetime of the assembly.

SUMMARY OF THE DISCLOSURE

In accordance with one aspect of the disclosure, a valve seal is provided. The valve seal includes a flow passage with an elliptical cross-section in a longitudinal direction, an annular flange in communication with the flow passage; and a hemispherically contoured sealing face opposite the annular flange and in communication with the flow passage.

In accordance with another aspect of the disclosure, a valve system for metering fluid flow is provided. The valve system includes a valve body having a substantially spherical valve chamber in communication with an annular inlet in parallel with and opposite an annular outlet which forms a passageway therethrough, a valve member with a substantially spherical surface configured to rotate perpendicularly to the passageway about a concentric valve shaft, the valve member having a fluid passage therethrough to selectively pass fluid from the inlet to the outlet, and a seat ring having a longitudinal bore with an elliptical cross-section and a sealing face hemispherically contoured to match the substantially spherical valve member surface.

In accordance with a further aspect of the disclosure, a method of manufacturing a valve seat is provided. The method includes the steps of selecting a valve member with a valve port and a valve member having known dimensions capable of a desired flow rate, determining dimensions of an elliptical flow port with a major-axis based on the known dimensions of the valve member and a minor-axis based on the known dimensions of the valve port, determining a profile of a mating surface configured to positively engage a surface of the valve member to form a fluid-tight seal between the elliptical flow port and the valve port, and manufacturing an annular valve seat according to the determined dimensions of the elliptical flow port and the determined profile of the mating surface.

DETAILED DESCRIPTION

Aspects of the disclosure will now be described in detail with reference to the drawings, wherein like reference numbers refer to like elements throughout, unless specified otherwise.

Figure 1:
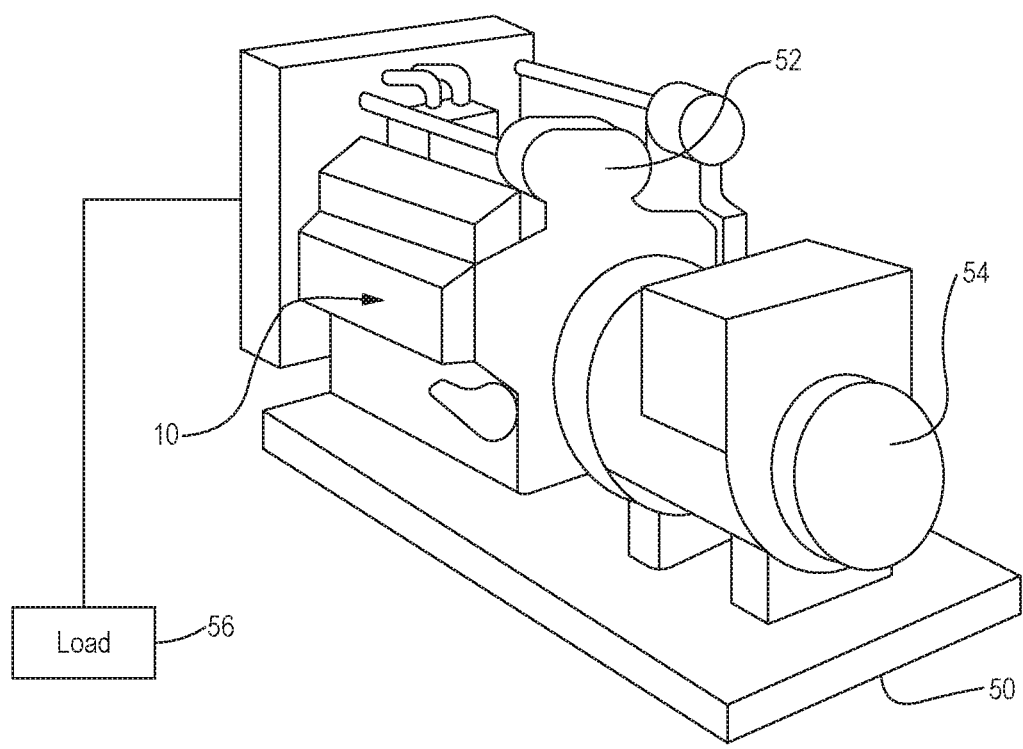
FIG. 1 is a diagrammatic side view of a work machine in accordance with the present disclosure.

Referring to FIG. 1, a schematic view of a work machine 50 is depicted. The work machine 50 includes a prime mover 52 that is operatively coupled to mechanically rotate a generator 54 that provides electrical power to an external load 54. The engine 52 is operatively coupled to a valve system 10 is shown, in accordance with certain embodiments of the present disclosure, that is configured to meter or throttle a fuel supply flow to the engine 52. For the purposes of this disclosure, the work machine 50 is depicted and described as a generator, for example, an AC induction generator, a permanent-magnet generator, an AC synchronous generator, or a switched-reluctance generator that is mechanically driven by prime mover 52 to produce electrical power. Furthermore, the prime mover 52 is depicted and described as a heat engine, for example, a combustion engine that combusts a mixture of fuel and air to produce the mechanical rotation. One skilled in the art will recognize that prime mover 52 may be any type of combustion engine such as, for example, a diesel engine, a gasoline engine, or a gaseous fuel-powered engine.

Figure 2:
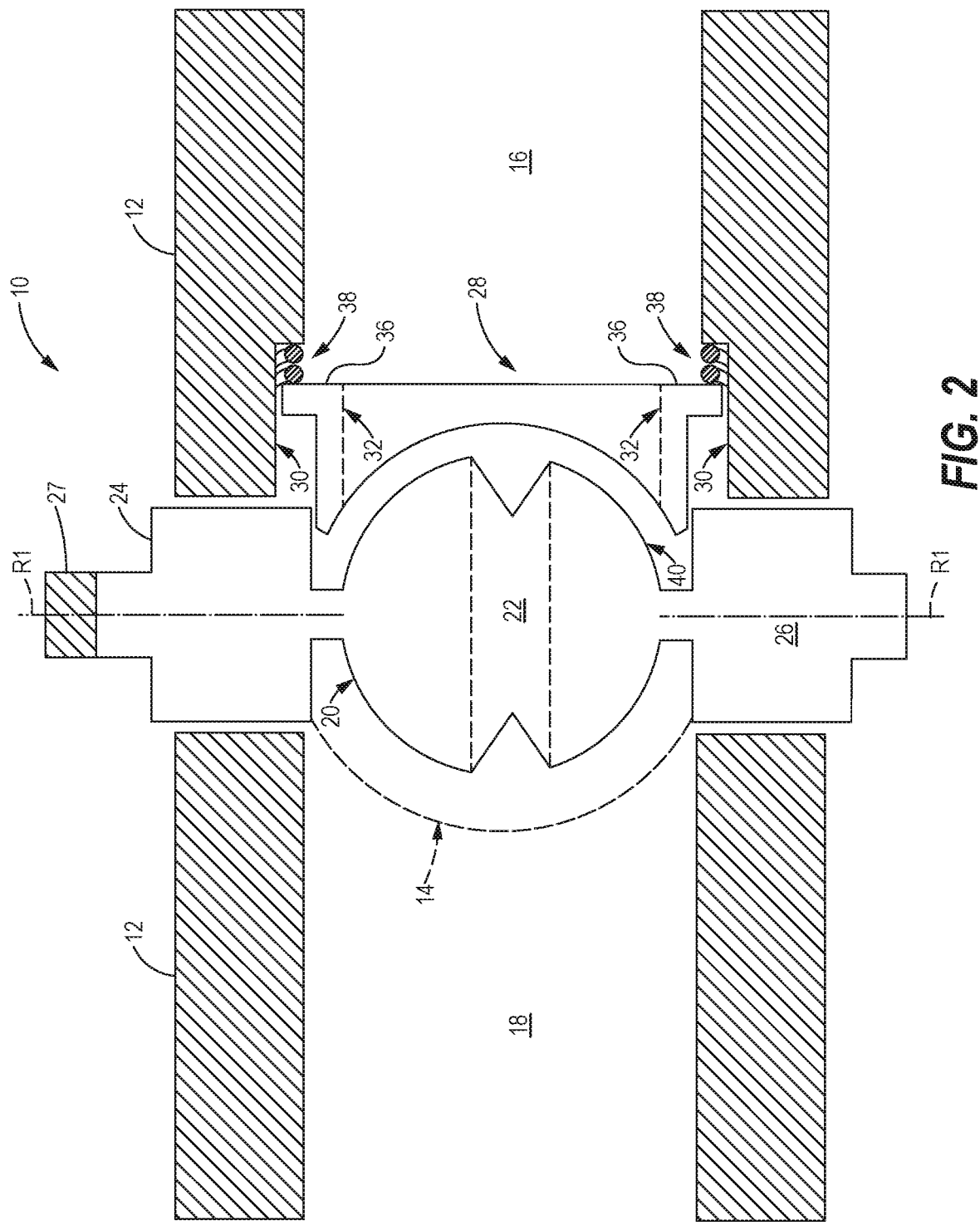
FIG. 2 is a cross-sectional view of an exemplary valve assembly contemplated.

Referring to FIG. 2, a cross-sectional view of the valve system 10 is depicted. While one non-limiting example of the system 10 is illustrated as a rotary ball valve, it will be understood that the system 10 may include other types of fluid metering systems such as rotary plug valves, butterfly valves, and other rotary valves not yet contemplated. The valve system 10 includes a valve body 12 that defines an internal hollow valve chamber 14 that is in fluid communication with an inlet 16 cylindrical passage and an outlet 18 cylindrical passage. Disposed within the valve chamber 14 is a valve member 20 with a valve member passage 22 therethrough. In the exemplary embodiment of a ball valve, the valve chamber 14 and corresponding valve member 20 are both substantially spherical. The valve member 20 is supported by a concentrically positioned valve stem 24 which defines an axis of rotation of the valve member 20 in a direction perpendicular to the direction of fluid flow. The valve stem 24 extends externally beyond an exterior of the valve chamber such that the valve member 20 can be externally rotated by a handle or an actuator (not shown). In addition, a trunnion support 26 positioned opposite and collinear to the valve stem 24 can further support the valve member 20 in high-pressure applications. An actuator 27 is mechanically attached to the valve stem 24 external to the valve body 12 for rotating the valve member 20 in accordance to a control signal from a controller to selectively control the angular position of the valve member 20 in order to meter fluid flow through the valve member fluid passage 22. The actuator 27 is chosen at least one of an electric, hydraulic, pneumatic, magnetic, and the like according to prescribed operating specifications. In the exemplary example, the actuator 27 is a limited angle torque motor.

In the open position, the valve member 20 is rotated such that the valve member passage 22 is substantially collinear with inlet 16 and outlet 18 to permit a continuous fluid passage through the valve system 10. In a closed position, the valve member 20 is rotated such that the valve member passage 22 does not communicate with the inlet 16 and the outlet 18. In addition, the valve member 20 can be rotated to intermediate rotational positions that correspond to partially open or, equivalently, partially closed rotational positions enabling the valve system 10 to be used for flow control, metering, or throttling. The valve stem 24 may be actuated manually by a handle or wheel, hydraulically, electrically, pneumatically, or the like.

An annular seat ring 28 is mounted in a counterbore 30 of the inlet 16. The annular seat ring 28 is a tubular member having an inner elliptical surface 32 which defines a longitudinal elliptical fluid passage 33 that is parallel and in communication with the inlet passage 16 and the valve member passage 22 when the valve member 20 is rotated to an open position. The annular seat ring 28 has a downstream sealing face 34 which is configured for sliding engagement with the valve member 20 to provide a fluid-tight seal between the inlet 16 and the valve member passage 22 to prevent fluid leakage debris collection in the valve chamber 14. With the exemplary embodiment of the ball valve as shown in FIG. 1, the sealing face 34 is contoured with a substantially spherical surface for mating with or engaging a substantially spherical valve member 20. It should be appreciated that the face may also be substantially cylindrical for mating with a plug valve member or any other valve member surface geometry not yet contemplated.

The annular seat ring 28 has an annular flange 36 at an upstream end of the tubular member. The flange 36 has an outer diameter surface that registers with an inner diameter surface of the counterbore 30 to form a fluid-tight seal between the inlet 16 and the valve member passage 22. A biasing member 38, such as a spring or other biasing means, is positioned within the counterbore 30 between the flange 36 and a stepped base of the counterbore 30 adjacent to the inlet 16. The biasing member 38 provides a positive sealing force against the annular seat ring 28 to create a substantially fluid-tight seal through a positive engagement between the contoured sealing face 32 and an external surface 40 of the valve member 20.

Figure 3:
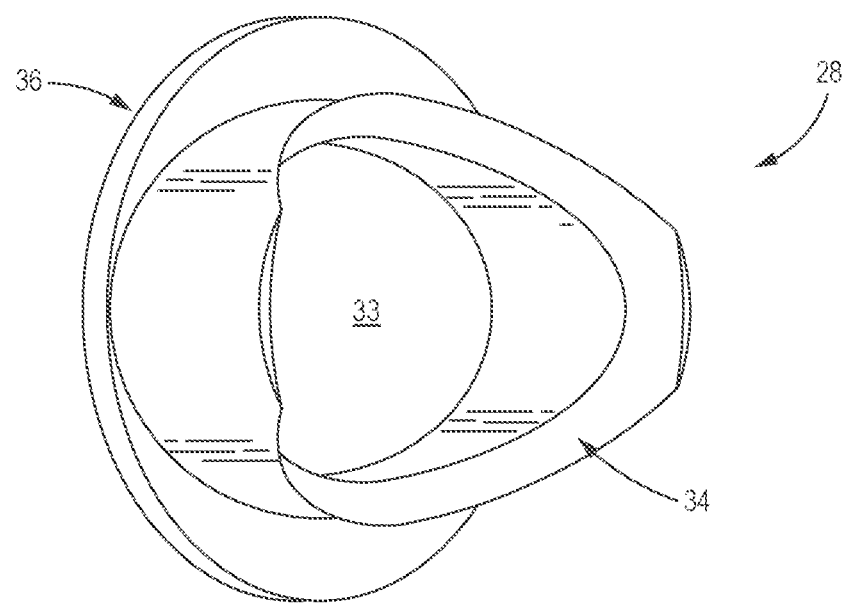
FIG. 3 is an isometric view of an exemplary annular valve seat of the valve assembly of FIG. 2.

FIG. 3 illustrates an isometric view of the annular seat ring 28 which shows the sealing face 34 in greater detail. The sealing face 34 has a hemispherical contour that is configured to match the substantially spherical external surface of the valve member 20. The contoured sealing face 34 results in a lower frictional force between the annular seat ring 28 and the spherical surface of the valve member 20 while maintaining a fluid-tight seal. This allows a lower rotational force on the valve stem 24 to change the valve system 10 from between the open position and the closed position, including intermediate positions therebetween that permit metering. The decreased lower rotational force requirement for actuation of the valve member 20 allows for increases in rotational speed thus reducing actuation times. The reduction increase in the overall lifetime of the valve system 10. The reduction in frictional forces allows for decreasing the size, weight, and costs as well as increasing the overall lifetime of the valve system 10.

Figure 4:
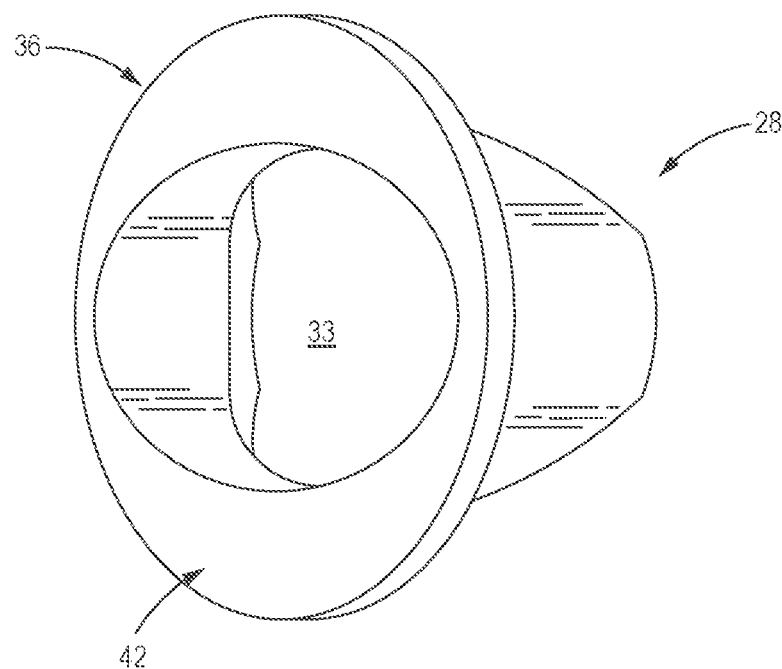
FIG. 4 is an isometric view of an exemplary annular valve seat of the valve assembly of FIG. 2.

FIG. 4 illustrates a rotated isometric view of the annular seat ring 28 which shows the elliptical fluid passage 33 and flange 36 in greater detail. The elliptical fluid passage 33 increases the flow rate of the valve system 10 without increasing the overall size of the valve system 10. In a conventional valve system that utilizes a seat ring with a cylindrical fluid passage, i.e. a circular cross-section, the only way to increase flow rates is to increase the size of the entire valve system, e.g. by increasing the size of the inlet, the outlet, the seat ring, valve member, valve stem, and the valve body, which greatly increases the input rotational drive necessary for actuation while also increasing the weight, manufacturing costs, and maintenance costs and thus reducing the effective lifetime of the valve system.

The flange 36 has an annular outside diameter that effectively matches the inside diameter of the counterbore 30. By having an annular outside diameter, the annular seat ring 28 can be used in existing valve systems that have tubular or cylindrical components such as the inlet, outlet, and counterbore. Utilizing the annular seat ring 28 in an existing valve system can increase the flow rate of fluid passing through the valve by increasing the exposed area to the valve member 20 without increasing the overall size of any of the valve system 10. The biasing member 38 has an effective diameter that corresponds to the diameter of the flat upstream face 42 of the flange 36. The biasing member 38 provides a symmetric loading force circumferentially about the valve member passage 22 in order to provide a positive biasing force longitudinally in the direction of the fluid flow against the surface 40 of the valve member 20. The biasing force can be calculated from the fluid pressure requirements of the valve system 10 in order to maintain a positive sealing force between the hemispherical contoured sealing face 34 and the spherical surface 40 of the valve member 20.

Figure 5:
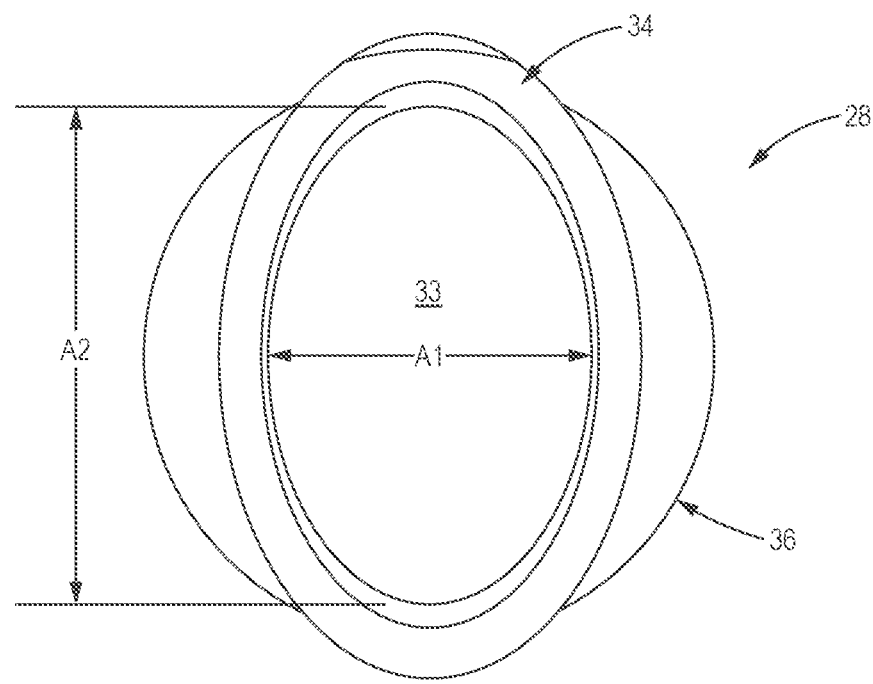
FIG. 5 is a top view of the exemplary annular valve seat of the valve assembly of FIG. 2.
Figure 6:
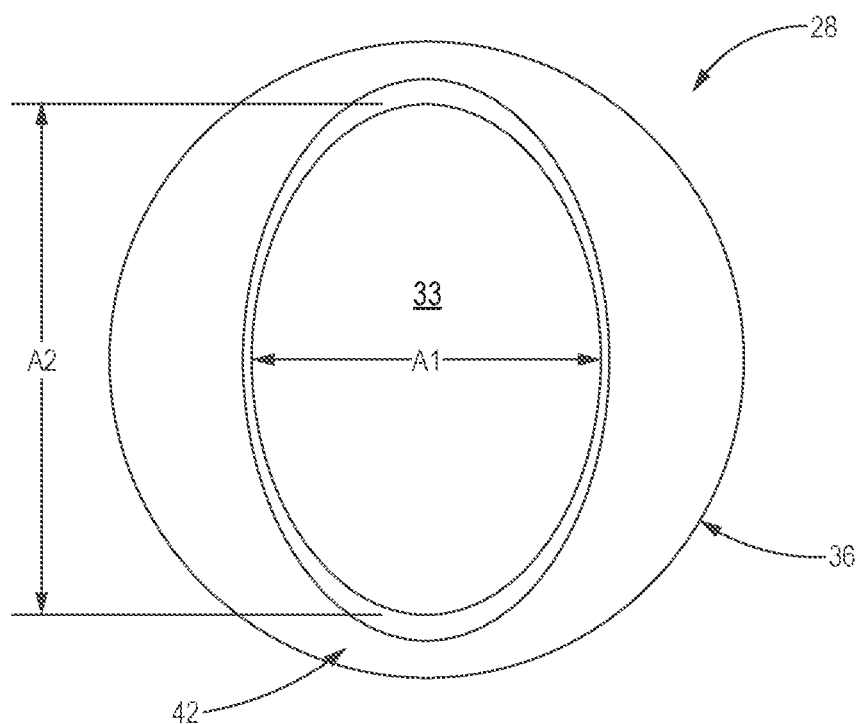
FIG. 6 is a bottom view of the exemplary annular valve seat of the valve assembly of FIG. 2.
Figure 7:
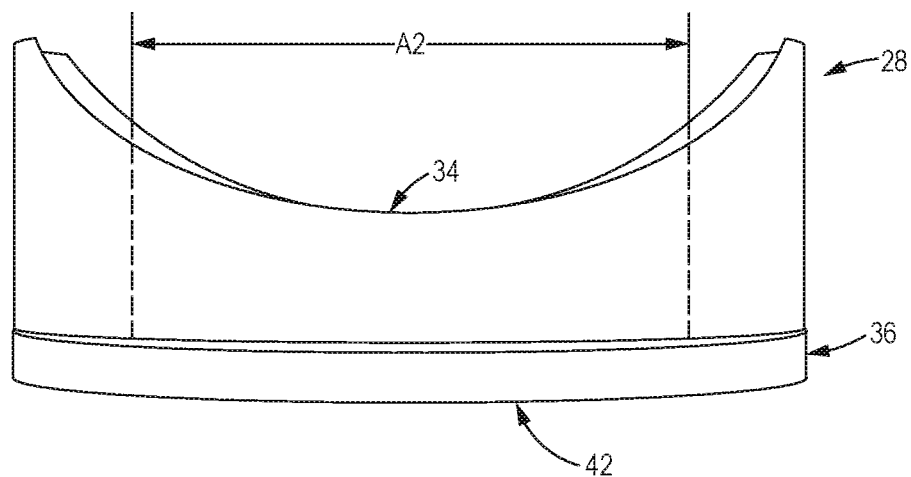
FIG. 7 is a top view of the exemplary annular valve seat along a major-axis of the valve assembly of FIG. 2.
Figure 8:
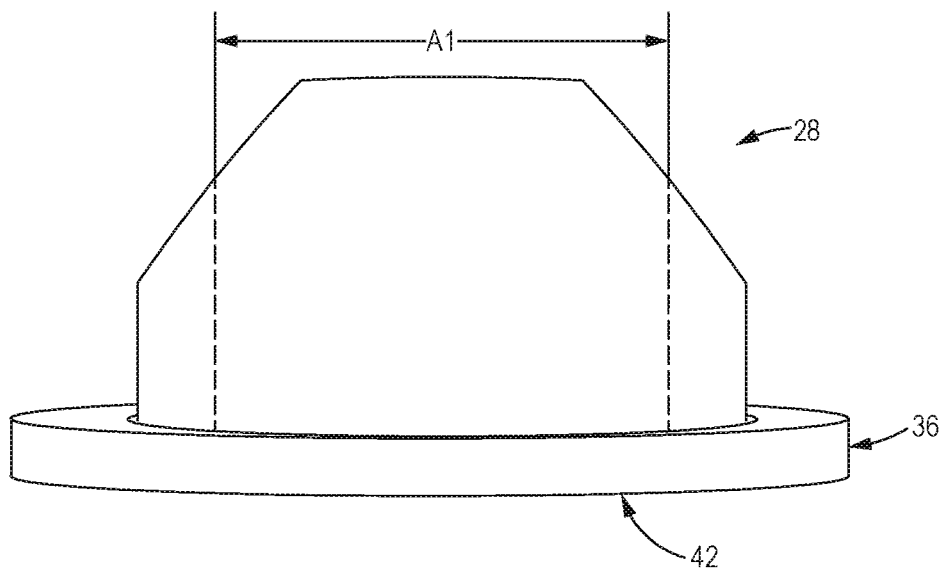
FIG. 8 is a bottom view of the exemplary annular valve seat along a minor-axis of the valve assembly of FIG. 2.

Referring to FIGS. 5-8, various isometric views of the annular seat ring 28 are illustrated to show the elliptical fluid passage 33 in greater detail. In FIG. 5, an isometric top view from the perspective of the upstream, contoured sealing face 34 shows the elliptical fluid passage 33. The elliptical fluid passage 33 has a minor axis A1 which is parallel to the direction of rotation of the valve member 20 (i.e. perpendicular to the axis of rotation R1) and a major axis A2 which is parallel to the axis of rotation of the valve member 20 (i.e. parallel to the axis of rotation R1). The dimension of the minor axis A1 can be calculated or determined based on the size of the fluid passage in the direction of rotation or based on the maximum angle of rotation of the actuator 27, i.e. the angle of rotation of the valve member is proportional to the dimension of the fluid passage in a direction of rotation. In other words, the dimension of the minor axis A1 corresponds to the maximum dimension of the valve member passage 22 in the direction of rotation. The dimension of the major axis A2 can be calculated or determined based on the size of the valve member 20 in the direction parallel to the axis of rotation R1. In the exemplary embodiment of the ball valve with a v-port fluid passage as illustrated in FIG. 2, at fully open or full port conditions the dimension of the valve member passage 22 and minor axis A1 are substantially similar or the same and the dimension of major axis A2 and the diameter of valve member 20 are substantially similar or the same.

INDUSTRIAL APPLICABILITY

In general, the valve system 10 of the present disclosure can find applicability in various industrial applications such as but not limited to work machines 50 such as those used throughout many industries, including but not limited to, earth moving, excavation, mining, agricultural, marine, construction, power generation, and other such industries. The present disclosure improves on the ability of the valve system 10 described above, to meter or throttle fuel to an engine 52 of the work machine 50. For example, the valve system 10 can be used in concert with a single point injection system on engine 52 of the work machine 50. The single point injection system may include a limited angle torque motor or limited angle torquer (LAT) which acts as the rotational actuator 27. A LAT is capable of intricate angular position, velocity, and acceleration control without torque ripple because of a single phase configuration and the lack of commutation required for angular excursions greater than 180°. For at least this reason, LATs are used in highly sensitive environments such as industrial, aerospace, semiconductor, medical, and military industries. An annular seat ring 28 incorporated into a single point injection system with a LAT can increase overall flow rates and reduce overall size by compensating for the limited angular rotation of the LAT. The annular seat ring 28 increases the useful area of flow in the plane of rotation.

Figure 9:
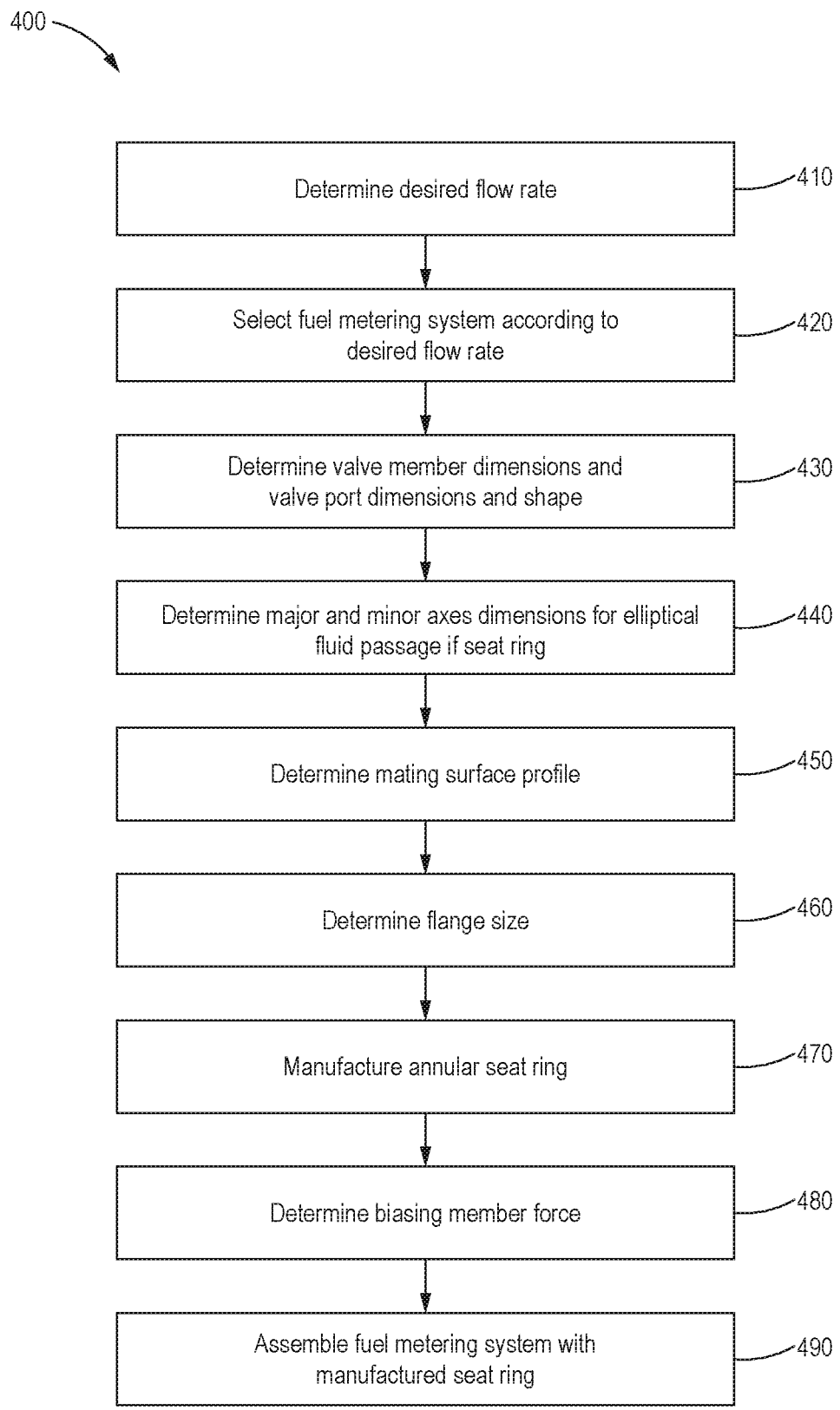
FIG. 9 is a flowchart depicting a series of steps involved in the manufacturing of an annular valve seat ring.

Referring to FIG. 9, steps of an embodiment of a method 400 of making an annular seat ring 28 with an elliptical fluid passage 33 following principles of the present disclosure are shown. In one embodiment, a method of making an annular seat ring 28 with an elliptical fluid passage 33 following principles of the present disclosure can be used to make an embodiment of an annular seat ring 28 with an elliptical fluid passage 33 according to principles of the present disclosure. In other embodiments, the annular seat ring 28 can be any suitable seat ring for use in a fluid metering system for liquid, oil, and/or gas.

The illustrated method 400 of making an annular seat ring 28 includes the step of determining the desired flow rate of the fluid metering system 410 based on the application of the system. In the exemplary embodiment of the ball valve for use in a providing metered fuel to a prime mover, this step involves determining the maximum, minimum, and range of fuel flow rates desired for operating the prime mover.

Once the desired specifications of the flow rates are known, a fuel metering system can be selected with the requisite characteristics for the application 420. In the exemplary embodiment of the ball valve, this step involves selecting a ball valve with a valve chamber, inlet, outlet, valve member, and valve port that is capable of providing the maximum, minimum, and intermediate range of fuel flow rates to operate the prime mover.

The valve port shape and dimensions along with the corresponding ball valve member dimensions are determined to accommodate the desired flow rate 430. For throttle control of fuel metering, a v-port or other port shape may be chosen for the valve port, followed by selecting a ball size capable of reliably accommodating the flow rate through the selected valve port size and shape. Next, a valve chamber with a corresponding inlet, outlet, and counterbore is selected based on the determined ball size.

The specifications of the annular seat ring 28 can be determined based on the desired flow rate, valve port shape and size, and the valve member shape and size step 440. In the exemplary embodiment of a ball valve, the minor axis of the elliptical fluid passage 33 is determined based on the maximum dimension of the valve port in the direction of rotation, and the major axis of the elliptical fluid passage 33 is determined based on the maximum dimension of the ball valve member in the direction of rotation axis. The profile of the mating surface of the annular seat ring 28 is determined based on the shape and size of the valve member 450. For example, the mating surface of the annular seat ring 28 is a concave hemispherical surface in order to positively engage with the convex spherical surface of the ball valve member. The flange of the annular seat ring 28 is determined based on the inner diameter of the inlet and corresponding counterbore of the valve chamber 460.

The annular seat 28 can be manufactured based on the determined specifications of the minor & major axes of the elliptical fluid passage 33, the contoured profile of the hemispheric mating surface, and the diameter of the flange 470. The annular seat ring 28 can be manufactured a number of ways such as subtractive machining, additive manufacturing, injection molding, and the like. The selected material type and manufacturing method can be determined based on operating environments which account for media/fluid type being metered, system operating pressure & temperature, duty cycle, and the like.

Once the annular seat ring 28 is manufacture according to determined specifications, a biasing spring can be selected according to the counterbore inner diameter and the desired positive sealing force between the annular seat ring 28 and the valve member 480. For example, a spring with a spring rate can be selected to maintain a positive sealing force between the hemispherical mating surface of the annular seat ring 28 and the spherical face of the ball valve member while also minimizing frictional forces in order to reduce the required input actuation force to rotate the ball valve member. Finally, the valve system can be assembled with the determined components, i.e. the valve member, valve chamber, and biasing member, along with the annular seat ring 28 manufactured to desired specifications 490.

Accordingly, by providing the system and method for increasing the maximum flow rate of the annular seat ring 28, the components of the ball valve system 10 as a whole can be reduced while simultaneously extending the useful lifetime of the valve system 10 and the annular seat ring 28 by reducing unwanted build up in the valve chamber 14. Further, aspects of the disclosure provide increased performance in the form of accuracy, actuation speed, fuel efficiency, and the like as a result of reducing the overall weight of the valve system 10 and components, i.e. the valve body 12, valve member 20, valve stem 24, trunnion support 26, biasing member 38, and actuator 27.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein is merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A valve seal, comprising:
   a tubular member defining an inner flow passage with an elliptical cross-section in a longitudinal direction;
   a downstream end of the tubular member having an annular flange having a flat face in communication with the inner flow passage; and
   an upstream end of the tubular member having a contoured sealing face having a hemispherical profile opposite the annular flange and in communication with the flow passage, in which the contoured sealing face is configured for sliding engagement with a spherical valve member, and the inner flow passage extends from the flat face to the contoured sealing face.

2. The valve seal of claim 1, wherein a major axis of the elliptical cross-section corresponds to a diameter of the spherical valve member.

3. The valve seal of claim 1, wherein a minor axis of the elliptical cross-section corresponds to a dimension of a port through the spherical valve member.

4. The valve seal of claim 1, wherein the flat face is configured to receive a biasing force in the longitudinal direction, wherein a biasing member provides positive sealing between the sealing face and the spherical valve member.

5. A valve system for metering fluid flow, comprising:
   a valve body having a substantially spherical valve chamber in communication with an annular inlet in parallel with and opposite an annular outlet which forms a passageway therethrough;
   a valve member with a substantially spherical surface configured to rotate perpendicularly to the passageway about a concentric valve shaft, the valve member having a fluid passage therethrough to selectively pass fluid from the inlet to the outlet; and
   a seat ring comprising:
      a tubular member defining an inner flow passage with an elliptical cross-section in a longitudinal direction,
      a downstream end of the tubular member having an annular flange with a flat face in communication with the inner flow passage, and
      an upstream end of the tubular member having a contoured sealing face with a hemispherical profile opposite the annular flange and in communication with the inner flow passage, in which the contoured sealing face is configured for sliding engagement with the spherical surface, and the inner flow passage extends from the flat face to the contoured sealing face.

6. The valve system of claim 5, wherein the elliptical cross-section defines a major-axis that corresponds to a diameter of the substantially spherical surface, the major axis being parallel to the valve shaft.

7. The valve system of claim 5, wherein the elliptical cross-section defines a minor-axis that corresponds to an angle of rotation of the valve member, the minor-axis being perpendicular to the valve shaft.

8. The valve system of claim 7, wherein the angle of rotation of the valve member is proportional to the dimension of the fluid passage in a direction of rotation.

9. The valve system of claim 5, wherein the annular flange extends radially outward having an outer diameter substantially similar to an inner diameter of the passageway.

10. The valve system of claim 9, further comprising a biasing member configured to engage the flat face of the annular flange in the longitudinal direction, wherein the biasing member provides positive sealing between the hemispherical sealing face and the substantially spherical surface.

11. The valve system of claim 5, further including:
   a work machine, wherein the valve system being employed on the work machine.

12. The valve system of claim 11, wherein the work machine includes an engine, the valve system being employed on the engine.

13. The valve system of claim 5, further comprising an actuator configured to selectively rotate the valve member in-between a fully open and a fully closed configuration in order to meter fluid flow through the fluid passage.

14. The valve system of claim 13, wherein the actuator is chosen from at least one of an electric, hydraulic, pneumatic, and magnetic.

15. A method of manufacture of a valve seat, the method comprising:
   selecting a spherical valve member with a valve port and the spherical valve member having known dimensions capable of a desired flow rate;
   determining dimensions of an elliptical flow port with a major-axis based on the known dimensions of the spherical valve member and a minor-axis based on the known dimensions of the valve port;
   determining a contour and hemispherical profile of a mating surface configured to positively engage a surface of the spherical valve member to form a fluid-tight seal between the elliptical flow port and the valve port; and
   manufacturing the valve seat according to the determined dimensions of the elliptical flow port and the determined profile of the mating surface, the valve seat comprising:

a tubular member defining the determined elliptical flow port, a downstream end of the tubular member having an annular flange having a flat face in communication with the determined elliptical flow port, and an upstream end of the tubular member having the determined mating surface opposite the annular flange and in communication with the determined elliptical flow port, in which the inner flow passage extends from the flat face to the determined mating surface.

16. The method according to claim 15, wherein the valve seat is manufactured using at least one of subtractive manufacturing, additive manufacturing, and injection molding.

17. The method according to claim 15, wherein the mating surface has a diameter fitted to that of the valve member.

18. The method according to claim 15, wherein the major-axis is determined based on a diameter of the spherical valve member and the minor-axis is based on a rotational width of valve port.

19. The method according to claim 15, further including:

selecting a ball valve assembly with the spherical valve member, the valve port, an inlet port capable of the desired flow rate;

the manufacturing the valve seat further including, the mating surface is hemispherically matched to a diameter of the spherical valve member, the major-axis is based on the diameter of the spherical valve member, and the minor-axis is based on a rotational width of the valve port;

determining a spring rate of a biasing member configured to apply a biasing force to the valve seat in a direction of fluid flow to form a fluid-tight seal between the mating surface and the spherical valve member; and assembling the ball valve assembly with the manufactured valve seat and determined spring rate.

* * * * *